(12) United States Patent
Kim

(10) Patent No.: US 12,479,441 B2
(45) Date of Patent: Nov. 25, 2025

(54) APPARATUS AND METHOD FOR CONTROLLING VEHICLE

(71) Applicants: Hyundai Motor Company, Seoul (KR); Kia Corporation, Seoul (KR)

(72) Inventor: Min Han Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 367 days.

(21) Appl. No.: 18/172,705

(22) Filed: Feb. 22, 2023

(65) Prior Publication Data

US 2024/0123997 A1    Apr. 18, 2024

(30) Foreign Application Priority Data

Oct. 18, 2022   (KR) .................. 10-2022-0134226

(51) Int. Cl.
*B60W 40/072* (2012.01)
*B60W 30/09* (2012.01)
(Continued)

(52) U.S. Cl.
CPC .......... *B60W 40/072* (2013.01); *B60W 30/09* (2013.01); *B60W 60/001* (2020.02);
(Continued)

(58) Field of Classification Search
CPC .. B60W 40/072; B60W 30/09; B60W 60/001; B60W 2420/403; B60W 2554/80; B60W 30/18145; B60W 30/12; B60W 10/20; B60W 40/105; B60W 2520/06; B60W 2552/30; B60W 2555/20; B60W 2555/60; B60W 2720/10; B60W 2754/30; G06V 20/588; G06V 10/44
See application file for complete search history.

(56) References Cited

U.S. PATENT DOCUMENTS 5,208,750 A * 5/1993 Kurami ................ G05D 1/0272
                                                           701/28
5,414,625 A * 5/1995 Hattori ................. G05D 1/0274
                                                           701/28
(Continued)

FOREIGN PATENT DOCUMENTS

CN    108460993 A  *  8/2018   ............ B60W 50/14
CN    118953369 A  * 11/2024   .......... B60W 40/072
(Continued)

OTHER PUBLICATIONS

JPH08290728A machine translation (Year: 1996).*
(Continued)

*Primary Examiner* — Angelina M Shudy
(74) *Attorney, Agent, or Firm* — Slater Matsil, LLP

(57) ABSTRACT

An embodiment apparatus for controlling a vehicle includes a camera and a controller configured to generate a detection line having a specified width based on a traveling direction of the vehicle within a road image obtained by the camera, to generate a corner point at a point where the detection line meets a line identified in the road image, and to control a speed of the vehicle by estimating a curvature of a road based on the corner point or to control steering based on an angle between the detection line and the line.

20 Claims, 20 Drawing Sheets

(51) Int. Cl.
*B60W 60/00* (2020.01)
*G06V 20/56* (2022.01)
(52) U.S. Cl.
CPC ..... *G06V 20/588* (2022.01); *B60W 2420/403* (2013.01); *B60W 2554/80* (2020.02)

(56) References Cited

U.S. PATENT DOCUMENTS

| | | | | |
|---|---|---|---|---|
| 5,631,639 | A * | 5/1997 | Hibino | B60W 30/18145 340/435 |
| 5,742,240 | A * | 4/1998 | Asanuma | B60K 31/0058 340/936 |
| 5,754,099 | A * | 5/1998 | Nishimura | B60T 7/22 342/70 |
| 5,892,855 | A * | 4/1999 | Kakinami | G06V 10/48 382/104 |
| 5,926,126 | A * | 7/1999 | Engelman | B60K 31/0008 340/988 |
| 6,370,474 | B1 * | 4/2002 | Hiwatashi | G08G 1/22 348/148 |
| 7,571,053 | B2 * | 8/2009 | Ishikura | G08G 1/167 348/119 |
| 8,909,388 | B1 * | 12/2014 | Kim | B60W 30/18 701/1 |
| 9,043,132 | B2 * | 5/2015 | Obi | B60T 7/22 701/400 |
| 9,227,568 | B1 * | 1/2016 | Hubbell | B60R 1/28 |
| 12,280,775 | B2 * | 4/2025 | Choi | B60W 10/20 |
| 2002/0095246 | A1 * | 7/2002 | Kawazoe | B62D 15/025 348/148 |
| 2005/0273261 | A1 * | 12/2005 | Niwa | B62D 15/029 340/436 |
| 2007/0191997 | A1 * | 8/2007 | Isaji | B60W 40/072 701/1 |
| 2008/0091327 | A1 * | 4/2008 | Tsuchiya | G06V 20/588 701/532 |
| 2010/0002911 | A1 * | 1/2010 | Wu | B60W 30/12 382/104 |
| 2010/0082203 | A1 * | 4/2010 | Isaji | B62D 15/025 701/41 |
| 2010/0250064 | A1 * | 9/2010 | Ota | B60W 40/076 348/148 |
| 2011/0231062 | A1 * | 9/2011 | Kim | B62D 15/025 701/1 |
| 2011/0238254 | A1 * | 9/2011 | Mulder | B60W 40/02 701/1 |
| 2012/0057757 | A1 * | 3/2012 | Oyama | G06V 20/588 382/104 |
| 2015/0166063 | A1 * | 6/2015 | Ishihara | B60W 30/14 701/41 |
| 2015/0307100 | A1 * | 10/2015 | Shimizu | B60W 40/109 701/96 |
| 2016/0107640 | A1 * | 4/2016 | Takahashi | B60W 30/12 701/41 |
| 2016/0121888 | A1 * | 5/2016 | Choi | G01S 13/867 701/1 |
| 2017/0270373 | A1 * | 9/2017 | Kawasaki | G06T 7/60 |
| 2018/0204075 | A1 * | 7/2018 | Kumano | G06V 20/588 |
| 2018/0286241 | A1 * | 10/2018 | Hearn | G06V 20/588 |
| 2018/0345953 | A1 * | 12/2018 | Mizoguchi | B60W 60/0015 |
| 2020/0047769 | A1 * | 2/2020 | Oguro | B60W 60/0051 |
| 2020/0134326 | A1 * | 4/2020 | Boev | B60W 40/072 |
| 2020/0180612 | A1 * | 6/2020 | Finelt | B60W 60/0027 |
| 2020/0193176 | A1 * | 6/2020 | Tanaka | B60W 10/04 |
| 2020/0234063 | A1 * | 7/2020 | Min | G06T 7/70 |
| 2020/0388157 | A1 * | 12/2020 | Fukushige | G08G 1/166 |
| 2021/0070288 | A1 * | 3/2021 | Yamaoka | G06V 20/588 |
| 2021/0197825 | A1 * | 7/2021 | Choi | G06V 20/58 |
| 2021/0245762 | A1 * | 8/2021 | Tsuru | B60W 30/18145 |
| 2021/0253127 | A1 * | 8/2021 | Chen | B60W 30/095 |
| 2022/0169310 | A1 * | 6/2022 | Choi | B62D 15/029 |
| 2022/0196797 | A1 * | 6/2022 | Parikh | G01S 13/89 |
| 2022/0198197 | A1 * | 6/2022 | Wan | G06F 30/23 |
| 2022/0234615 | A1 * | 7/2022 | Nishino | G01S 17/931 |
| 2022/0274601 | A1 * | 9/2022 | Jia | B60W 40/072 |
| 2022/0306129 | A1 * | 9/2022 | Nishino | B60W 50/0098 |
| 2023/0077036 | A1 * | 3/2023 | Yamaguchi | B60W 30/16 |
| 2023/0080281 | A1 * | 3/2023 | Kundu | G06N 5/022 701/410 |
| 2023/0109155 | A1 * | 4/2023 | Takehara | B62D 15/025 701/26 |
| 2024/0051549 | A1 * | 2/2024 | McGrory | B60W 40/105 |
| 2024/0051584 | A1 * | 2/2024 | Tamura | B60W 60/0053 |
| 2024/0071091 | A1 * | 2/2024 | Jo | B60W 40/105 |
| 2024/0388799 | A1 * | 11/2024 | Hirata | G06V 20/588 |
| 2025/0010877 | A1 * | 1/2025 | Fan | G01C 21/3655 |
| 2025/0042410 | A1 * | 2/2025 | Kang | B60W 30/10 |

FOREIGN PATENT DOCUMENTS

| | | | |
|---|---|---|---|
| JP | H08290728 | A * | 11/1996 |
| JP | 2014118000 | A * | 6/2014 |
| KR | 20130054032 | A | 5/2013 |
| KR | 20130054636 | A | 5/2013 |

OTHER PUBLICATIONS

CN-108460993-A machine translation (Year: 2018).*
CN-118953369-A machine translation (Year: 2024).*
JP-2014118000-A machine translation (Year: 2014).*

* cited by examiner

APPARATUS AND METHOD FOR CONTROLLING VEHICLE

CROSS-REFERENCE TO RELATED APPLICATIONS

This application claims the benefit of Korean Patent Application No. 10-2022-03134226, filed on Oct. 18, 2022, which application is hereby incorporated herein by reference.

TECHNICAL FIELD

The present disclosure relates to an apparatus and method for controlling a vehicle.

BACKGROUND

A vehicle driving assistance function includes a function of steering and maintaining a lane based on a line recognized through a camera mounted on a windshield glass to reduce a driver's burden and improve convenience.

Among vehicle driving assistance functions, a lane keeping assist system (LKAS) is a function of keeping a driving lane (a function of preventing departure from the lane). When driving on a road with a small radius of curvature during high-speed driving, it is difficult to decelerate sufficiently because the LKAS is not interlocked with vehicle speed control. In addition, when driving on a road with a large radius of curvature during high-speed driving, it is difficult for the LKAS function to operate normally because steering is not performed smoothly along the curvature of the road. Therefore, there is a need to provide a technology capable of keeping a lane by controlling steering and vehicle speed according to the traveling direction of a vehicle and the curvature of a road.

SUMMARY

An embodiment of the present disclosure provides an apparatus and method for controlling a vehicle capable of keeping a lane by controlling steering and vehicle speed according to the traveling direction of the vehicle and the curvature of a road.

Embodiments of the present disclosure can solve problems occurring in the prior art while advantages achieved by the prior art are maintained intact. The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling a vehicle includes one or more cameras that obtain a road image and a controller that generates a detection line having a specified width based on a traveling direction of the vehicle within the road image, generates corner points at a point where the detection line meets a line, and controls a vehicle speed by estimating a curvature of a road based on the corner point or controls steering based on an angle between the detection line and the line.

The controller may generate a cornering line that connects two corner points and a center line that coincides with the traveling direction of the vehicle and passes through a center of the vehicle when the two corner points are generated and estimate the curvature of the road based on an angle between the cornering line and the center line.

The controller may generate an arc passing through the corner point and estimate the curvature of the road based on a radius of curvature of the arc when two or more corner points are generated by additionally generating the corner points at a point where the center line meets the line.

The controller may determine a target cornering speed corresponding to the estimated curvature of the road based on vehicle characteristics, a learned vehicle condition, weather information, traffic information, road information, and driving information.

The controller may control deceleration when a current speed of the vehicle is greater than or equal to the target cornering speed and control to maintain the current speed when the current speed of the vehicle is less than the target cornering speed.

The controller may set the cornering line as a barrier line and control braking when a distance to an obstacle detected in a front of the vehicle is less than a distance to the barrier line.

The controller may generate a target point at a center of a road based on a corner point when one corner point is generated, calculate an angle between the detection line and the line, determine whether the vehicle is located close to an inner line or an outer line based on the angle, and control steering according to a determination result.

The controller may determine, among both side lines of a lane in which the vehicle travels, a line in which the corner point is generated as the inner line and determine a line in which the corner point is not generated as the outer line.

The controller may increase a steering angular velocity as the vehicle approaches the inner line.

The camera may include a first camera that obtains the road image in a first field of view (FOV) and a second camera that obtains a plurality of curved road images in a second FOV that is wider than the first FOV.

According to another embodiment of the present disclosure, a method of controlling a vehicle includes obtaining a road image by using one or more cameras, generating a detection line having a specified width based on a traveling direction of the vehicle within the road image, generating a corner point at a point where the detection line meets a line, and controlling a vehicle speed by estimating a curvature of the road based on the corner point or controlling steering based on an angle between the detection line and the line.

The method may further include generating a cornering line that connects two corner points and a center line that coincides with the traveling direction of the vehicle and passes through a center of the vehicle when the two corner points are generated and estimating the curvature of the road based on an angle between the cornering line and the center line.

The method may further include generating an arc passing through the corner point and estimating the curvature of the road based on a radius of curvature of the arc when two or more corner points are generated by additionally generating corner points where the center line meets the line.

The method may further include determining a target cornering speed corresponding to the estimated curvature of the road based on vehicle characteristics, a learned vehicle condition, weather information, traffic information, road information, and driving information.

The method may further include controlling deceleration when a current speed of the vehicle is greater than or equal to the target cornering speed and controlling to maintain the current speed when the current speed of the vehicle is less than the target cornering speed.

The method may further include setting the cornering line as a barrier line and controlling braking when a distance to an obstacle detected in a front of the vehicle is less than a distance to the barrier line.

The method may further include generating a target point at a center of the road based on the corner point when one corner point is generated, determining whether the vehicle is located close to an inner line or an outer line based on the angle, and controlling steering according to a determination result.

The method may further include determining, among both side lines of the lane in which the vehicle travels, a line in which the corner point is generated as the inner line and determining a line in which the corner point is not generated as the outer line.

The method may further include increasing a steering angular velocity as the vehicle approaches the inner line.

The camera may include a first camera that obtains the road image in a first FOV and a second camera that obtains a plurality of curved road images in a second FOV that is wider than the first FOV.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
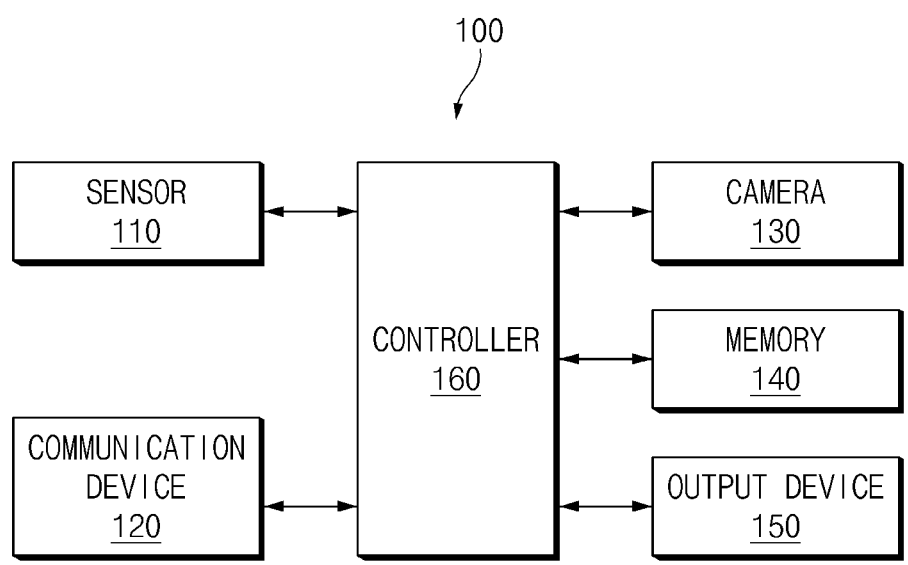
FIG. 1 is a block diagram illustrating a configuration of an apparatus for controlling a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing an embodiment of the present disclosure, a detailed description of the related known configuration or function will be omitted when it is determined that it interferes with the understanding of the embodiment of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a configuration of an apparatus for controlling a vehicle according to an embodiment of the present disclosure.

As shown in FIG. 1, an apparatus 100 for controlling a vehicle may include a sensor 110, a communication device 120, a camera 130, a memory (i.e., storage) 140, an output device 150, and a controller 160. The apparatus 100 for controlling a vehicle of embodiments of the present disclosure may be built into a vehicle, accurately recognize a curved road when a driving assistance function is executed or in autonomous driving, improve riding comfort of an occupant by linking a vehicle speed and steering control corresponding to the curved road, and alleviate a jerk behavior of the vehicle.

The sensor 110 may obtain driving information obtained while the vehicle travels. According to an embodiment, the sensor 110 may include a yaw rate sensor that obtains a yaw rate, a roll sensor that obtains a roll angle, an acceleration sensor that obtains acceleration, a wheel sensor that obtains a vehicle speed, and the like. In addition, the sensor 110 may include a radar, lidar, and ultrasonic sensor for detecting an obstacle in front.

The communication device 120 may communication with a server or portable terminal. The communication device 120 may communication with a server or portable terminal in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment, the communication device 120 may receive weather information, traffic information (accident information and traffic congestion information), and road information (children protection zone, wild animal habitat, and the like) from a server or portable terminal.

The camera 130 may obtain a road image. According to an embodiment of the present disclosure, the camera 130 may include a short-range camera and a long-range camera. For a more detailed description, refer to FIG. 2.

Figure 2:
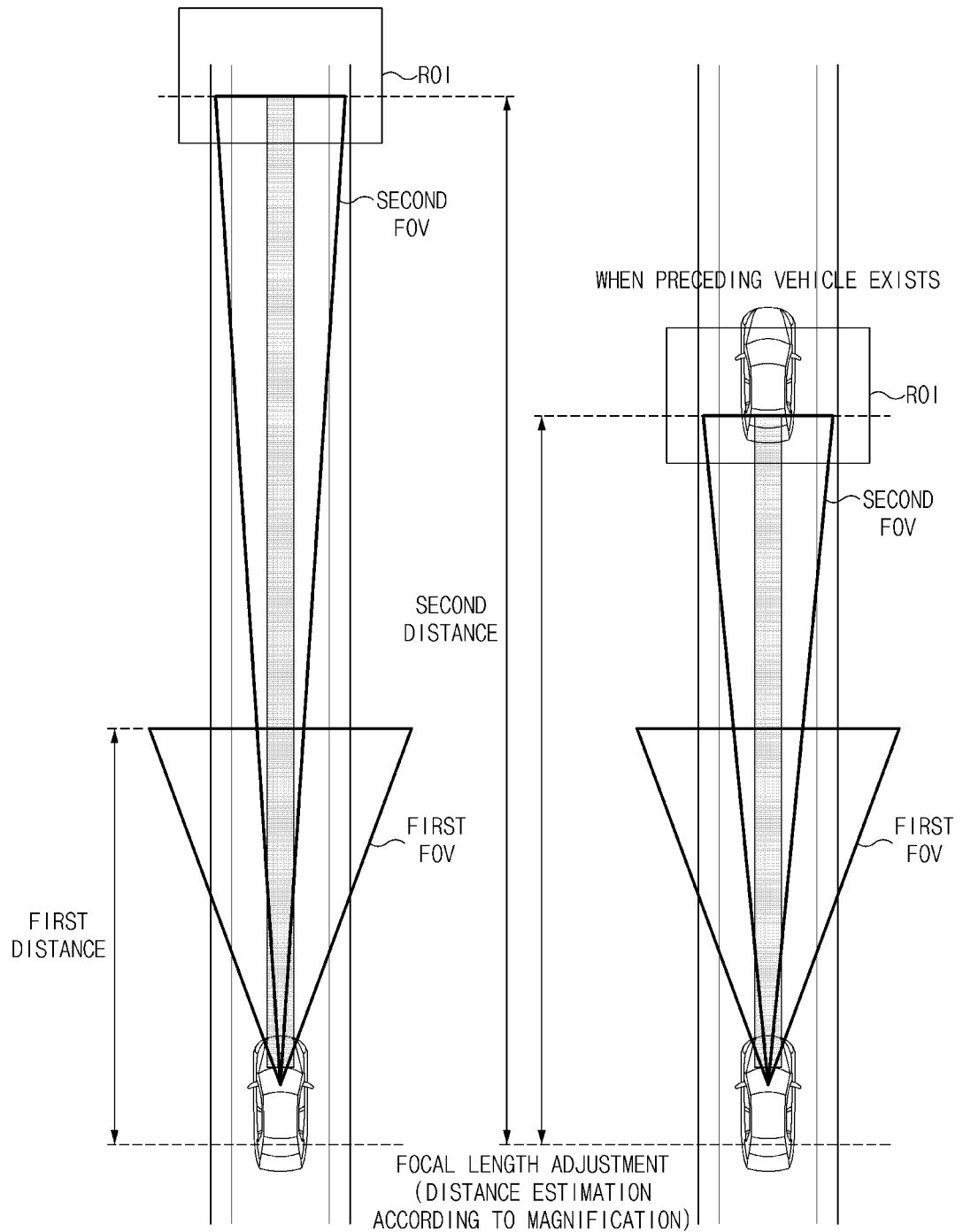
FIG. 2 is a diagram showing a camera FOV according to an embodiment of the present disclosure.
Figure 3:
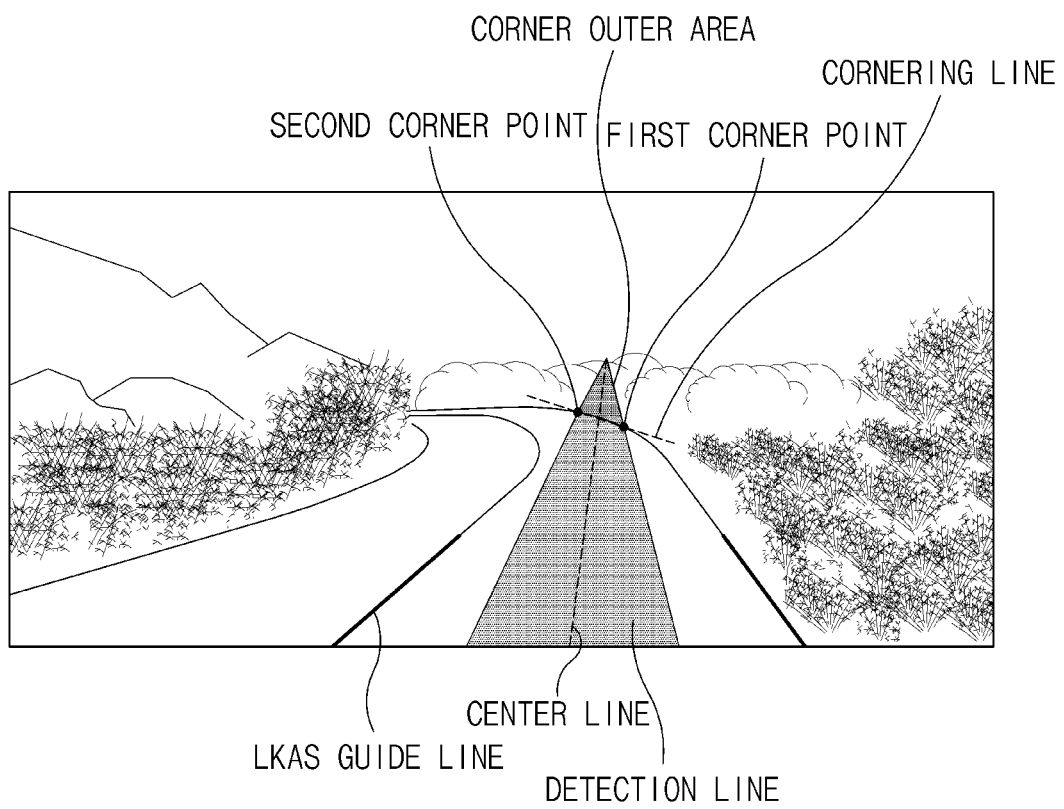
FIG. 3 is a diagram schematically illustrating factors required for vehicle control according to an embodiment of the present disclosure.

FIG. 2 is a diagram showing a camera FOV according to an embodiment of the present disclosure. FIG. 3 is a diagram schematically illustrating factors required for vehicle control according to an embodiment of the present disclosure.

As shown in FIG. 2, the short-range camera may have a first FOV within a first distance from the camera and obtain a line image on a road within the first distance. The long-range camera may have a second FOV that is within a second distance from the camera that is longer than the first distance and is wider than the first FOV and may obtain a line image on the road within the second distance, that is, the second FOV. The long-range camera may adjust the focal length depending on the presence or absence of a vehicle in front, and the FOV may vary according to the focal length. The long-range camera may obtain images of a plurality of curved roads when the plurality of curved roads exists within the second distance.

The memory 140 may store at least one algorithm for performing operations or executions of various commands for the operation of an apparatus for controlling a vehicle according to an embodiment of the present disclosure. The memory 140 may include at least one storage medium of a flash memory, a hard disk, a memory card, a read-only memory (ROM), a random access memory (RAM), an electrically erasable programmable read-only memory (EE-PROM), a programmable read-only memory (PROM), a magnetic memory, a magnetic disk, and an optical disk.

The output device 150 may visually output an image obtained by the camera 130. The output device 150 may include a display device that outputs an image or video, and the display device may include a navigation display, a HUD, a cluster, and the like. In addition, the output device 150 may output a warning message or warning image when lane departure is predicted according to the determination of the controller 160. In addition, the output device 150 may output required information when vehicle speed control or steering control is required to keep a lane.

The controller 160 may be implemented with various processing devices such as a microprocessor and the like in which a semiconductor chip capable of performing operations or executions of various commands is built-in and may control operations of an apparatus for controlling a vehicle according to an embodiment of the present disclosure. The controller 160 may be electrically connected to the sensor no, the communication device 120, the camera 130, the memory 140, and the output device 150 through a wired cable or various circuits to transfer an electrical signal including a control command and the like, and may transmit and receive an electrical signal including a control command and the like through various wireless communication networks such as a controller area network (CAN).

The controller 160 may obtain a factor required for vehicle control. The detailed operation of the controller 160 will be described with reference to FIG. 3.

FIG. 3 is a diagram schematically illustrating a factor required for vehicle control according to an embodiment of the present disclosure.

As shown in FIG. 3, the controller 160 may generate an LKAS guideline by detecting a line in the obtained image (road image). The controller 160 may generate a straight center line that coincides with the traveling direction of the vehicle and passes through the center of the vehicle. The controller 160 may generate a detection line having a specified width based on the center line. The controller 160 may create one or more corner points (a first corner point and a second corner point) at a point where the detection line and the line meet. According to an embodiment, the controller 160 may additionally generate a point where the center line and the line meet as a corner point. The controller 160 may generate a cornering line connecting the first corner point and the second corner point and may set an area other than the road on which the vehicle travels among the areas where the detection line is generated as an area outside the corner. According to an embodiment, the controller 160 may distort the road image and convert it into a warped view type to process the image in order to obtain a factor required for vehicle control. When a plurality of corner points are generated based on an image obtained through a long range camera and a plurality of cornering lines are generated, the controller 160 may control the vehicle based on the cornering line generated closest to the vehicle.

The controller 160 may predict the curvature of the road based on the factor required for vehicle control. For a more detailed description, refer to FIGS. 4 and 5.

Figure 4:
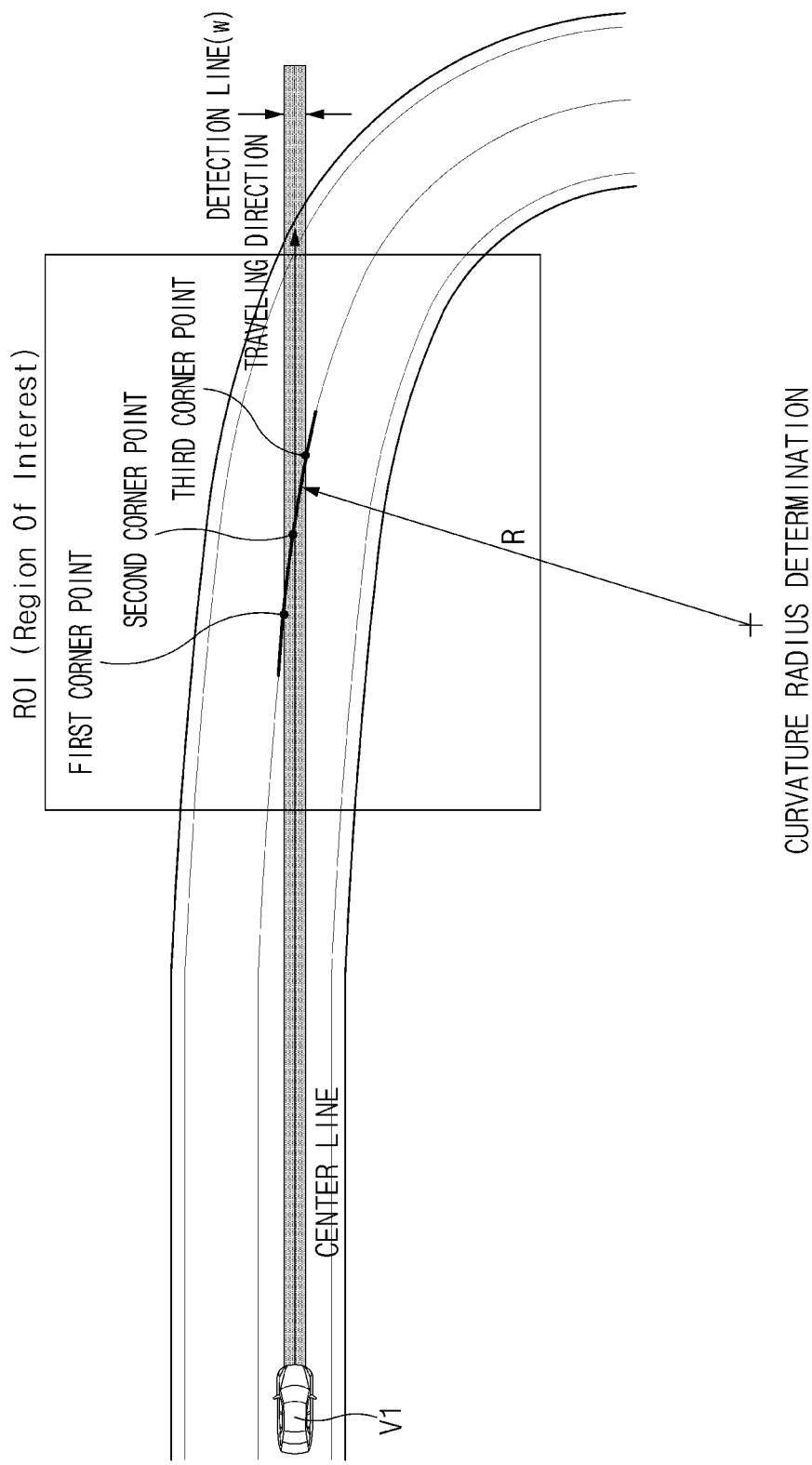
FIG. 4 is a diagram schematically illustrating a scheme of determining a road curvature according to an embodiment of the present disclosure.
Figure 5:
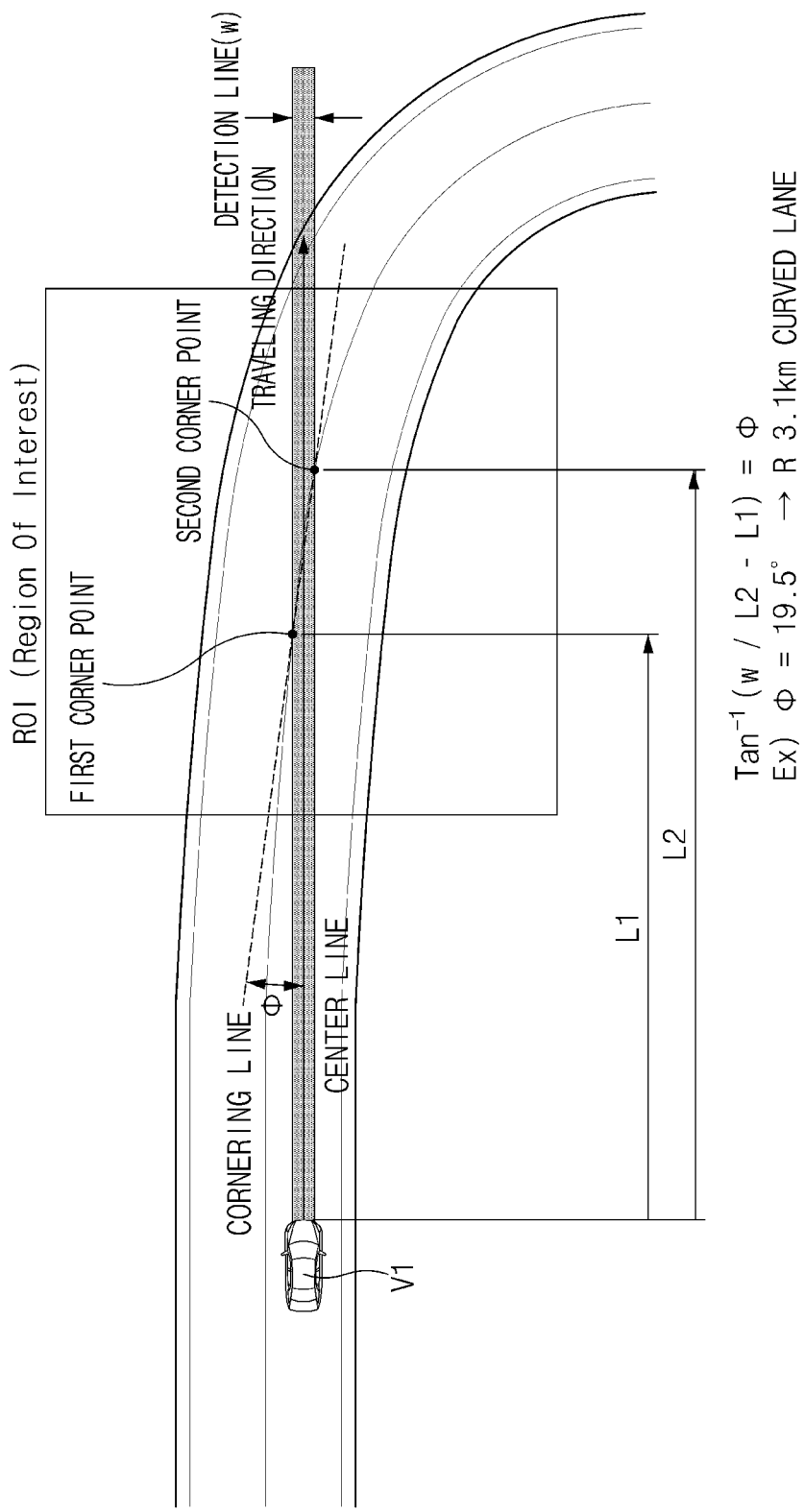
FIG. 5 is a diagram schematically illustrating a scheme of determining a road curvature according to another embodiment of the present disclosure.

FIG. 4 is a diagram schematically illustrating a scheme of determining a road curvature according to an embodiment of the present disclosure. FIG. 5 is a diagram schematically illustrating a scheme of determining a road curvature according to another embodiment of the present disclosure.

As shown in FIG. 4, when a detection line having a specified width "w" is generated based on a center line, the controller 160 may generate a point where the detection line and the line meet and a point where the center line and the line meet, as a first corner point, a second corner point, and a third corner point. The controller 160 may generate an arc passing through the first corner point, the second corner point, and the third corner point, and predict the curvature of the road based on the curvature radius "R" of the arc.

As shown in FIG. 5, when the detection line having a specified width "w" is generated based on the center line, the controller 160 may generate points where the detection line and the line meet as the first corner point and the second corner point. The controller 160 may generate a cornering line connecting the first corner point and the second corner point, calculate an angle φ formed between the cornering line and the center line, and predict the curvature of the road based on the angle.

According to the embodiment, the controller 160 may calculate the angle by using Equation 1:

$$\phi = \tan^{-1}\left(\frac{w}{L2 - L1}\right) \qquad \text{Equation 1}$$

where w is the width of the detection line, L1 is the distance from the camera 130 of a vehicle V1 to the first corner point, and L2 is the distance from the camera 130 of the vehicle V1 to the second corner point.

When the curvature of the road is predicted, the controller 160 may determine a target cornering speed corresponding to the curvature of the road. According to an embodiment of the present disclosure, the controller 160 may determine the target cornering speed corresponding to the curvature of the road based on vehicle characteristics, learned vehicle conditions, weather information, traffic information, road information, and driving information.

The controller 160 may obtain characteristics of a vehicle based on a body type, specification information, suspension setting information, a tire specification of the vehicle, and the like. When the performance of the vehicle deteriorates as tires wear out as the vehicle travels, the controller 160 may collect vehicle information and obtain a state of the vehicle through learning of the collected information. The controller 160 may receive weather information, traffic information, and road information from a server or portable terminal, determine a road surface condition due to the influence of weather, determine a situation in which forward visibility is not secured due to traffic congestion or an accident based on traffic information, and determine whether the road is a children's protection area or wild animal habitat based on the road information. The controller 160 may determine driving information based on a drive mode set according to the driver's intention. For example, when the drive mode is a comfort mode, the controller 160 may minimize a rolling amount and set a slow vehicle speed when driving on a curve to improve riding comfort, and may determine driving information accordingly. For example, the controller 160 may determine that a curved road having a road curvature of 3.1 km is located 500 m in front of the vehicle, when the drive mode of the vehicle is set to the comfort mode, determine the target cornering speed as 60 km/h, and when the current speed is faster than the target cornering speed, determine at what point to execute deceleration control.

Therefore, according to the embodiments, in determining the target cornering speed, it is possible to more actively determine a target cornering speed not only by predicting and reflecting the road curvature of a curved road, but also by reflecting vehicle characteristics, learned vehicle conditions, weather information, traffic information, road information, and driving information. For a more detailed description, refer to FIGS. 6 to 9.

FIGS. 6 to 9 are diagrams schematically illustrating a speed control scheme according to a road curvature according to an embodiment of the present disclosure.

Figure 6:
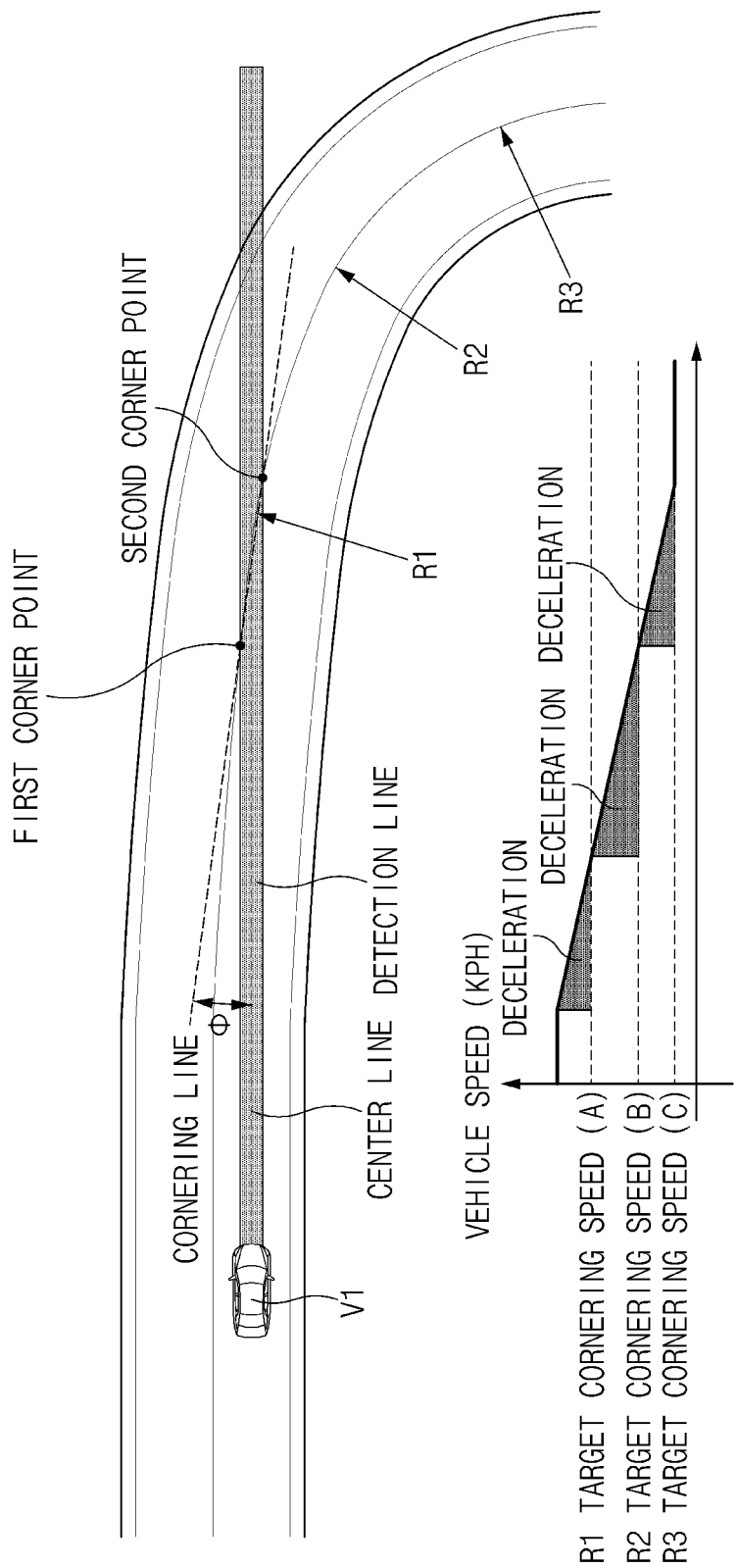
FIGS. 6 to 9 are diagrams schematically illustrating a speed control scheme according to a road curvature according to an embodiment of the present disclosure.

As shown in FIG. 6, the controller 160 may generate a detection line based on a center line when a curved road exists in front of the vehicle V1, generate, as the first corner point and the second corner point, points where the detection line and the line meet, generate a cornering line connecting the first corner point and the second corner point, calculate an angle φ between the cornering line and the center line, and predict the road curvatures at points R1, R2 and R3 based on the angle. In addition, the controller 160 may determine target cornering speeds corresponding to the curvatures of the road based on vehicle characteristics, learned vehicle conditions, weather information, traffic information, road information, and driving information at points R1, R2, and R3, and determine the deceleration by comparing the driving speed (current speed) and the target cornering speed at the location of the vehicle V1. According to an embodiment, a target cornering speed A at point R1, a target cornering speed B at point R2, and a target cornering speed C at point R3 may be determined.

Figure 7:
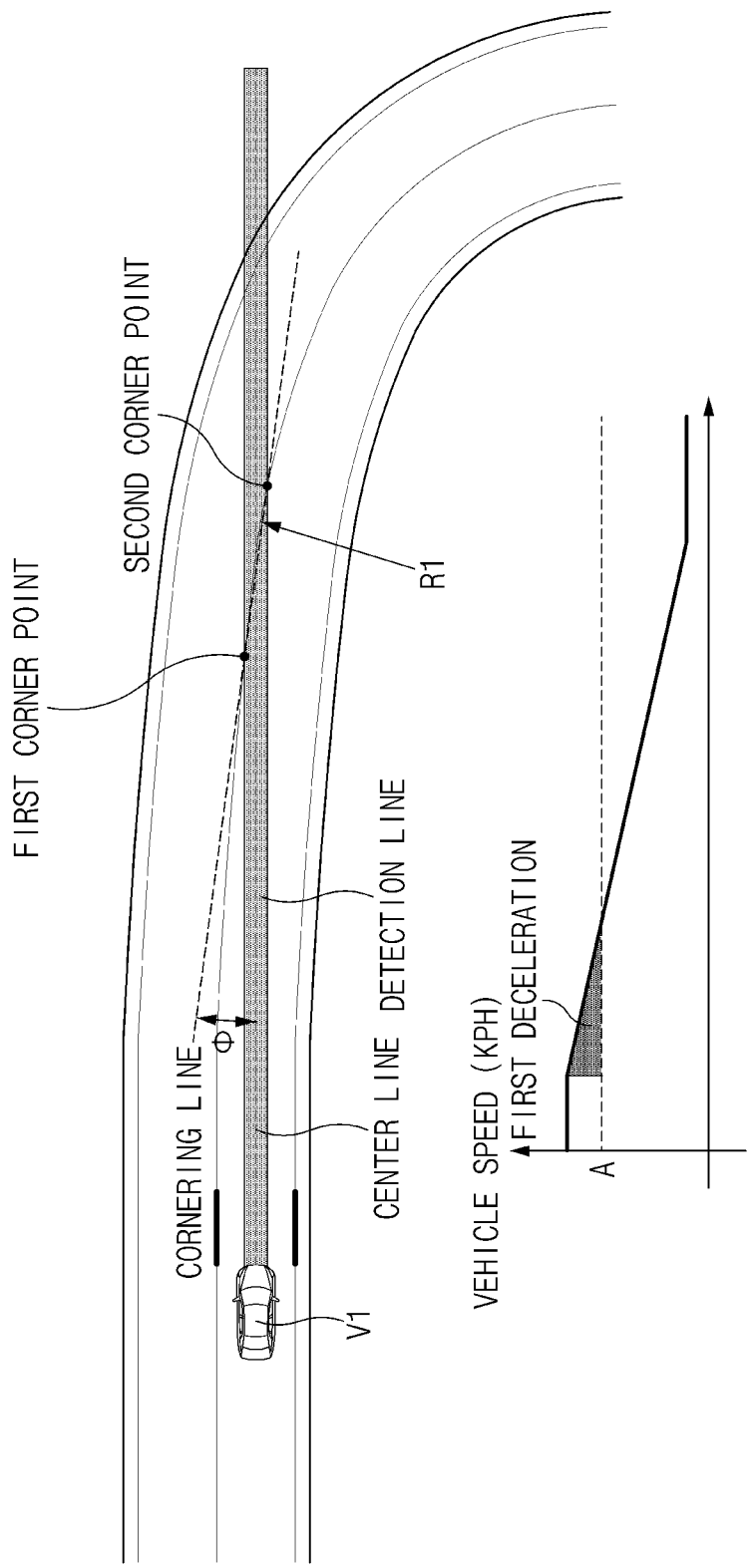

As shown in FIG. 7, the controller 160 may calculate an angle φ between the cornering line and the center line at point R1, determine a target cornering speed by estimating the curvature of the road based on the angle, and control the vehicle V1 to first decelerate in order for the vehicle V1 to drive at the target cornering speed A at the point R1.

Figure 8:
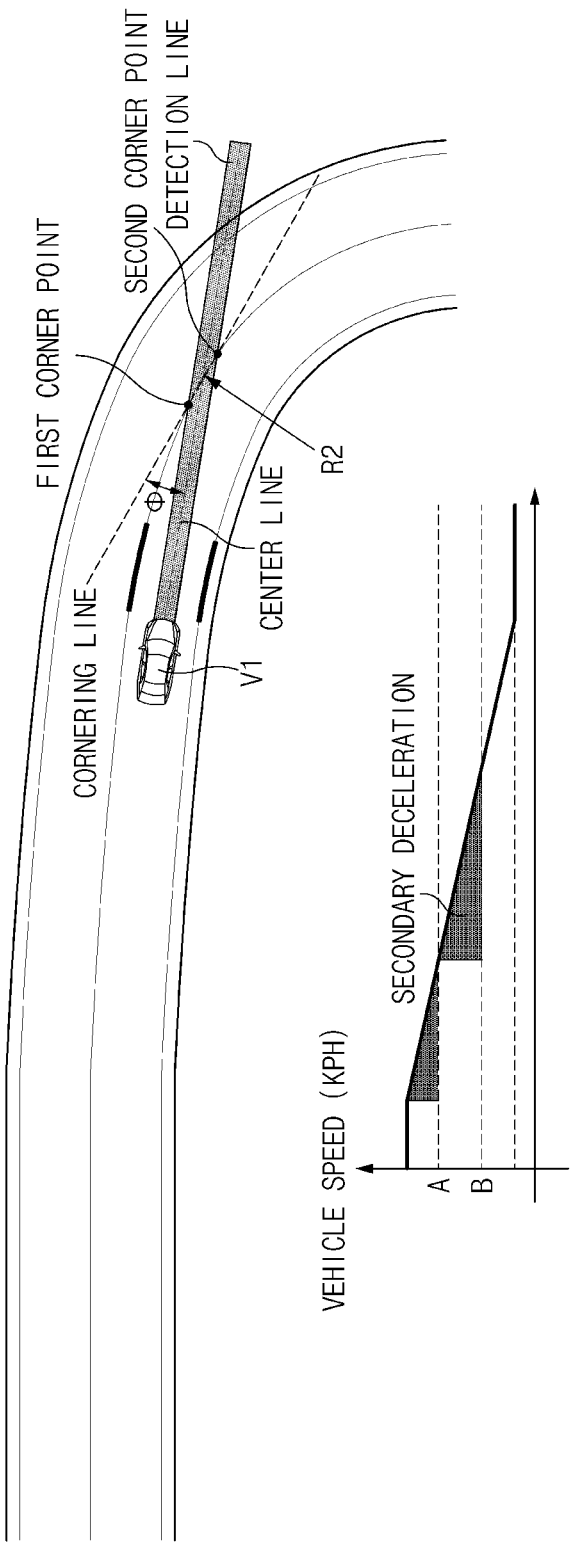

As shown in FIG. 8, the controller 160 may calculate the angle φ between the cornering line and the center line at the point R2, determine the target cornering speed by estimating the curvature of the road based on the angle, and control the vehicle V1 to secondarily decelerate to drive at the target cornering speed B at the point R2.

Figure 9:
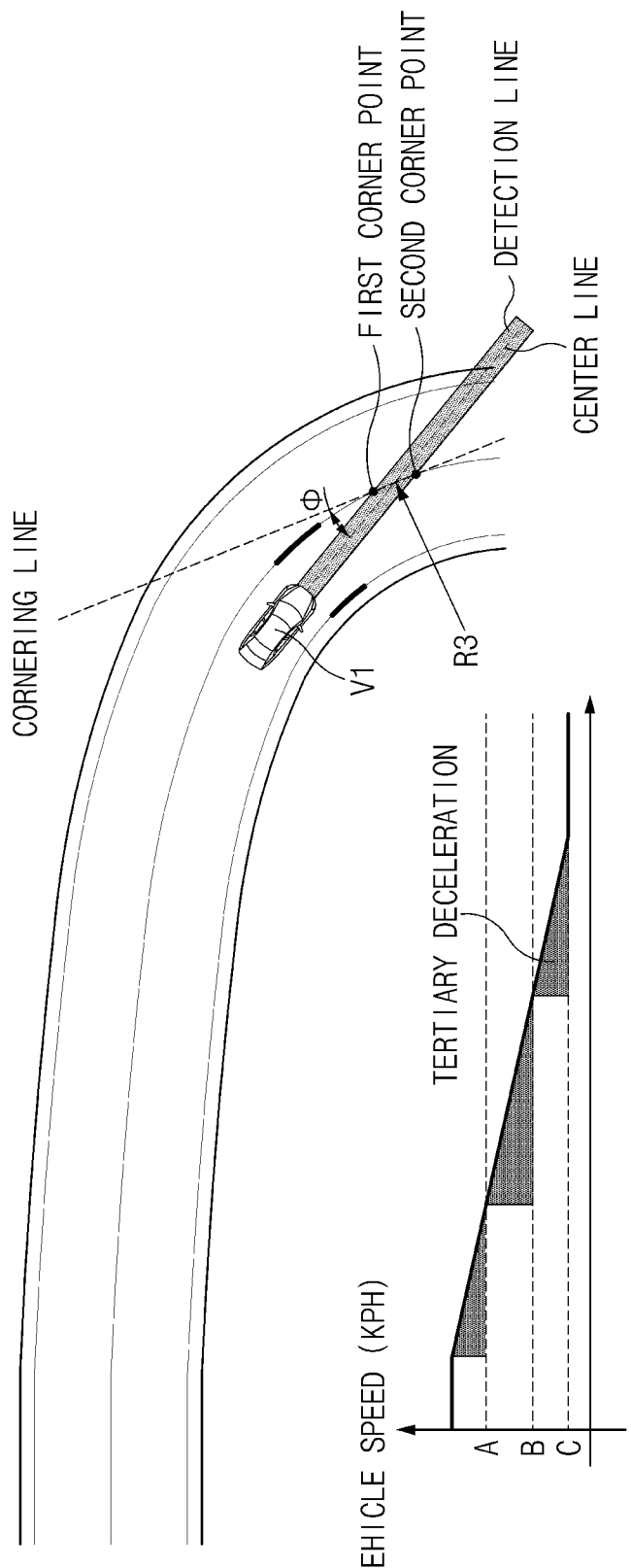

As shown in FIG. 9, the controller 160 may calculate the angle φ between the cornering line and the center line at the point R3, determine the target cornering speed by estimating the curvature of the road based on the angle, and control the vehicle V1 to decelerate the third time in order to drive at the target cornering speed C at the point R3.

The controller 160 may determine a deceleration time point based on the difference between the current driving speed and the target cornering speed. According to an embodiment, when the difference between the driving speed and the target cornering speed at the vehicle location is greater than or equal to a threshold value, the controller 160 may determine the deceleration time point earlier than the deceleration time point when the difference between the driving speed and the target cornering speed at the vehicle location is less than the threshold value.

Figure 10:
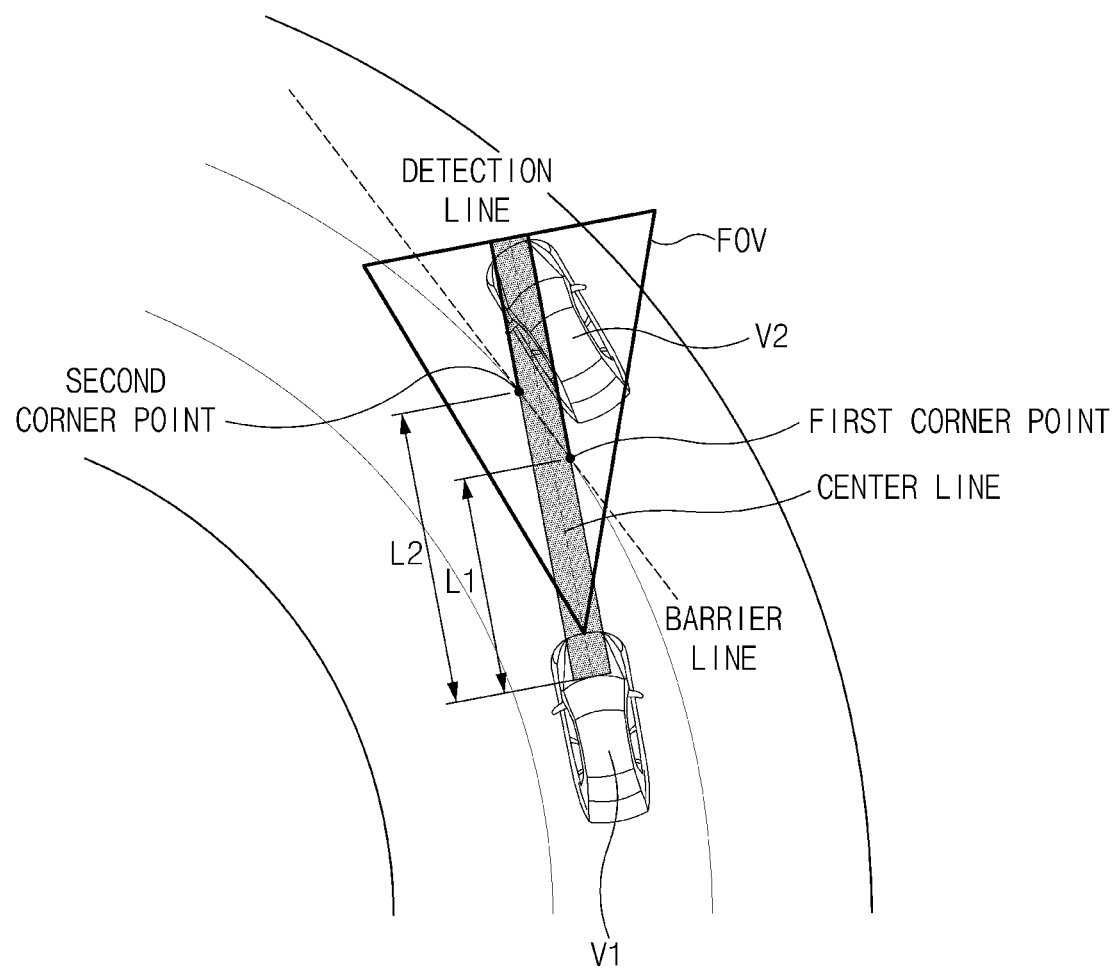
FIG. 10 is a diagram schematically illustrating an outer area of a corner detected according to an embodiment of the present disclosure.

FIG. 10 is a diagram schematically illustrating an outer area of a corner detected according to an embodiment of the present disclosure.

As shown in FIG. 10, the controller 160 may generate the detection line based on the center line, generate points where the detection line and the line meet as the first corner point and the second corner point and generate the cornering line connecting the first corner point and the second corner point. Because the controller 160 detects an obstacle located in front of the vehicle V1, the controller 160 may detect an obstacle located within the FOV. The controller 160 may detect not only a preceding vehicle (not shown) traveling in the same lane on a curved road, but also a preceding vehicle V2 traveling in a lane adjacent to the lane in which the vehicle V1 travels. That is, the front vehicle V2 is located in an outer area of the corner, which is an area other than the road on which the vehicle travels, among the areas where the detection lines are generated.

The front vehicle V2 does not affect the driving of the vehicle V1, but according to the related art, when the front vehicle V2 traveling in a lane adjacent to the lane in which the vehicle V1 travels is detected, it may be determined as an obstacle, so that phantom braking in which the vehicle V1 brakes abruptly occurs, thereby causing a jolt. According to an embodiment of the present disclosure to solve such a problem, the controller 160 may set the cornering line as a barrier line, and brake only when the distance from the camera of the vehicle V1 to the obstacle is less than the distance to the barrier line, thereby preventing phantom braking from occurring.

According to an embodiment of the present disclosure, when the curvature radius of the road is more than a threshold value and is close to a straight line, the controller 160 may detect one corner point and estimate the curvature of the road based on the one corner point. For a more detailed description, refer to FIGS. 11 and 12.

Figure 11:
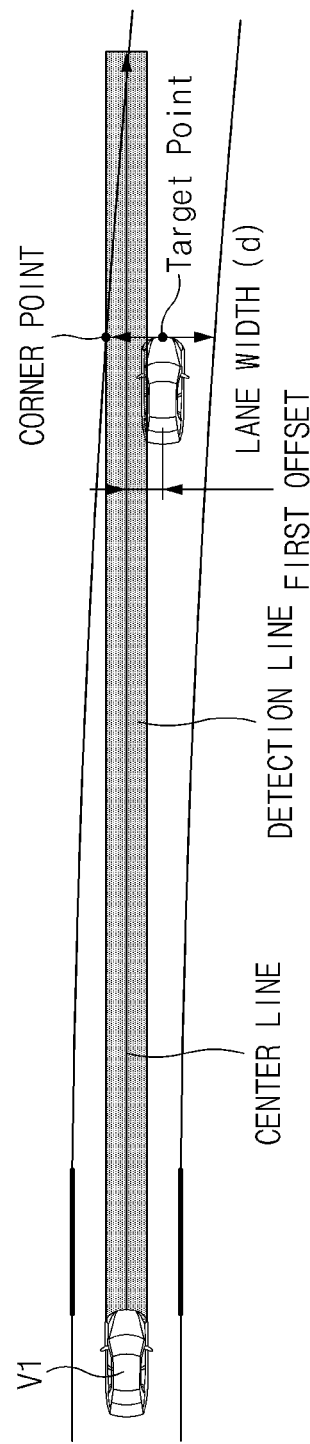
FIGS. 11 and 12 are diagrams schematically illustrating a scheme of determining a road curvature according to a corner point determined on a curved road according to an embodiment of the present disclosure.
Figure 12:
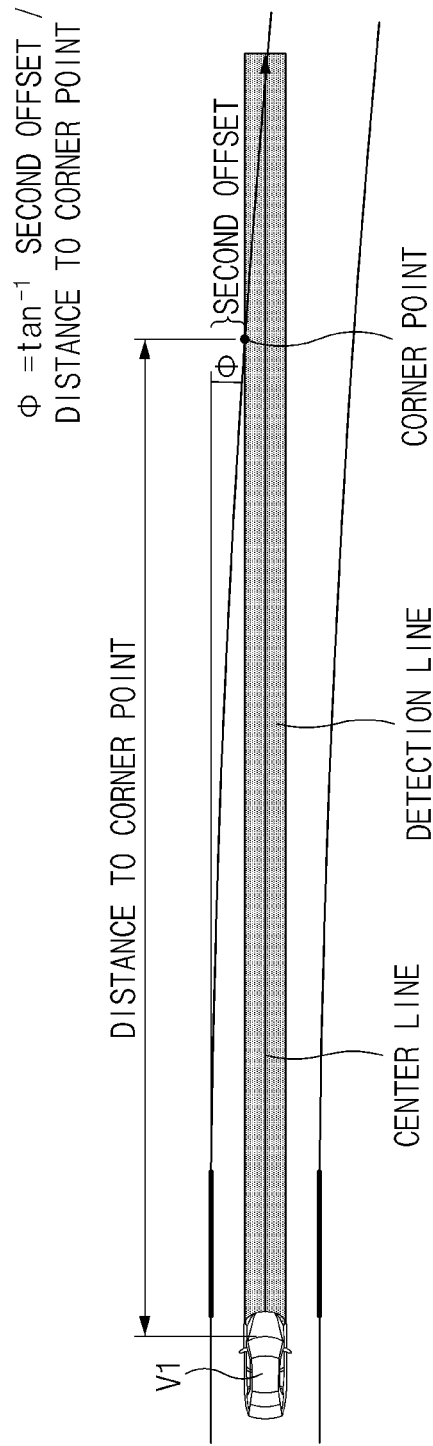

FIGS. 11 and 12 are diagrams schematically illustrating a scheme of determining a road curvature according to a corner point determined on a curved road according to an embodiment of the present disclosure.

As shown in FIG. 1i, the controller 160 may generate a point where the detection line and the line meet as a corner point and set the center of the lane in which the vehicle V1 travels as a target point based on the corner point. In addition, the controller 160 may calculate the distance between the center line and the target point as a first offset, and when the first offset exceeds a first reference value, the curvature of the road may be estimated based on the first offset.

As shown in FIG. 12, the controller 160 may generate a point where the detection line and the line meet as a corner point and calculate the distance between the corner point and a line extending the lane in which the vehicle V1 travels in a straight line as a second offset. Based on the distance from the camera to the corner point and the second offset, the controller 160 may calculate an angle φ between a straight line extending the lane in which the vehicle V1 travels and the line. When the angle φ exceeds the second reference value, the controller 160 may calculate the road curvature based on the second offset.

The controller 160 may generate a corner point even on a straight road and control steering such that the vehicle travels around the center line. For a more detailed description, refer to FIGS. 13 to 16.

FIGS. 13 to 16 are diagrams schematically illustrating a scheme of controlling steering according to a corner point determined on a straight road according to an embodiment of the present disclosure.

Figure 13:
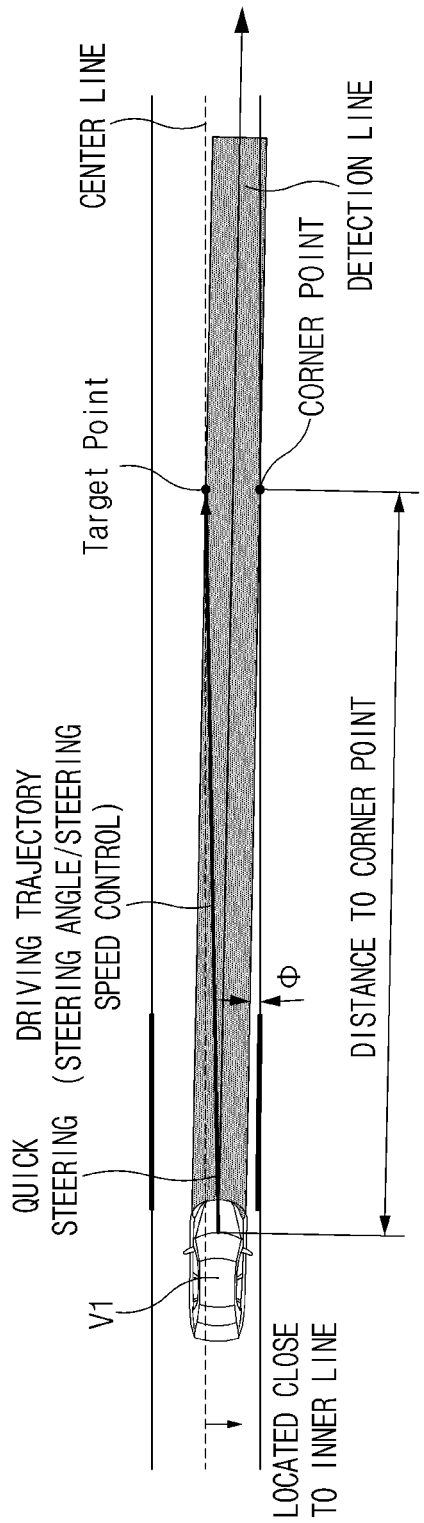
FIGS. 13 to 16 are diagrams schematically illustrating a scheme of controlling steering according to a corner point determined on a straight road according to an embodiment of the present disclosure.

As shown in FIG. 13, the controller 160 may generate a line extending from the center of both side lines of the lane in which the vehicle V1 travels as a center line, generate a point where the detection line and the line meet as a corner point, and set a target point on the center line based on the corner point. The target point may be changed to a target point for steering control such that the vehicle travels on the center line.

The controller 160 may determine a line in which departure of the vehicle is predicted based on the detection line. According to an embodiment, the controller 160 may determine a line in which vehicle departure is predicted as an inner line and a line in which vehicle departure is not predicted as an outer line, among both side lines of the lane in which the vehicle travels. That is, the controller 160 may determine a line where a corner point is generated as an inner line and a line where a corner point is not created as an outer line. In addition, the controller 160 may determine whether the vehicle is located close to the inner line or close to the outer line based on the center line.

When the angle φ between the detection line and the line is less than a reference angle, the controller 160 may determine that the vehicle travels at a location close to the inner line and control the steering angular velocity based on the distance from the camera of the vehicle V1 to the corner point. The controller 160 may increase the steering angular velocity by determining that the vehicle V1 needs to be quickly steered in order to target the target point based on the distance from the camera to the corner point.

Figure 14:
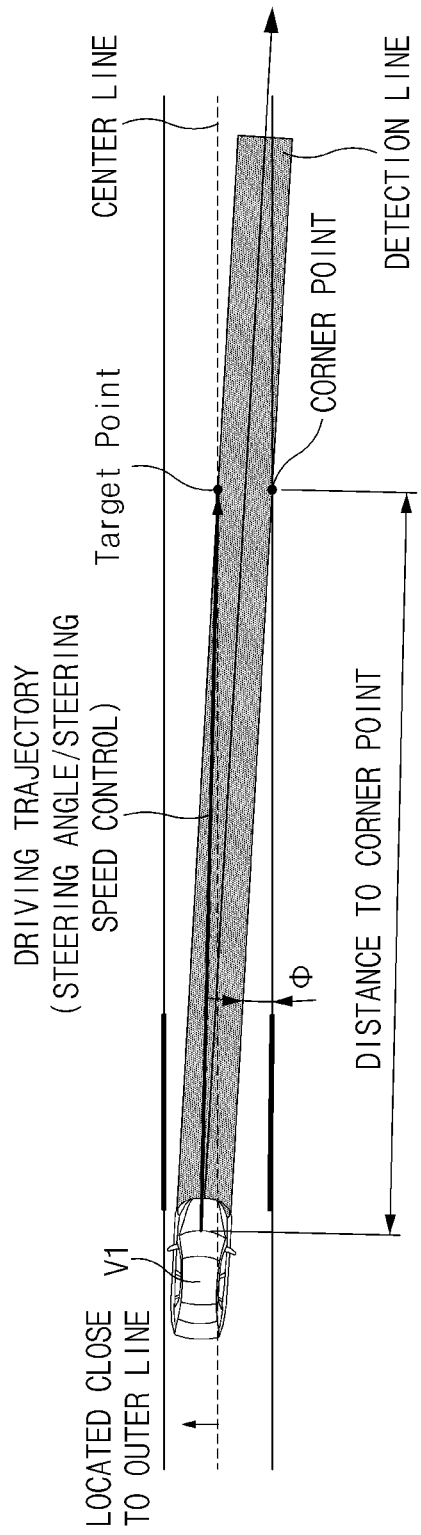

As shown in FIG. 14, the controller 160 may generate a line extending from the center of both side lines of the lane in which the vehicle V1 travels as a center line, generate a point where the detection line and the line meet as a corner point, and set a target point on the center line based on the corner point.

The controller 160 may determine that the vehicle V1 travels at a location close to the outer line when the angle φ between the detection line of the vehicle V1 and the inner line is equal to or greater than the reference angle and control the steering angular velocity based on the distance from the camera of vehicle V1 to the corner point. The controller 160 may determine that the steering does not need to be done quickly to drive to the target point based on the distance from the camera to the corner point and control the steering while improving ride comfort without increasing the steering angular velocity.

Figure 15:
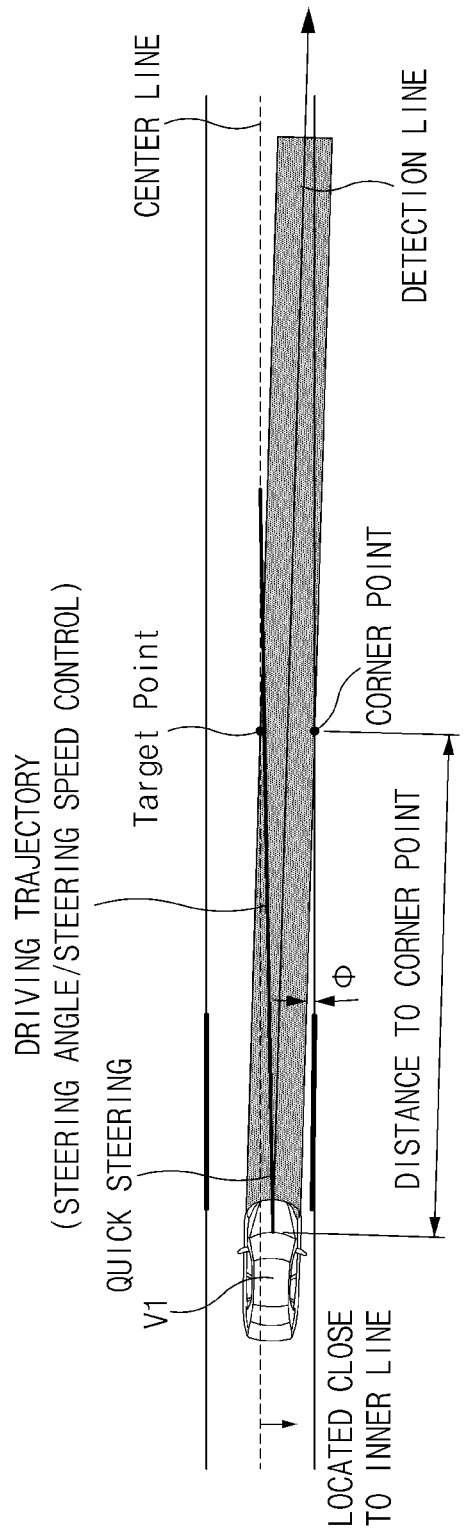

As shown in FIG. 15, the controller 160 may generate a line extending from the center of both side lines of the lane in which the vehicle V1 travels as a center line, generate a point where the detection line and the line meet as a corner point, and set a target point on the center line based on the corner point.

The controller 160 may determine that the vehicle V1 travels at a location close to the inner line when the angle φ between the detection line and the line is less than the reference angle and control the steering angular velocity based on the distance from the camera of the vehicle V1 to the corner point. According to an embodiment, when the distance from the camera of the vehicle V1 to the corner point is less than or equal to the reference distance (e.g., shorter than the distance from the camera of the vehicle V1 to the corner point in FIG. 13), the controller 160 may increase the steering angular velocity to be greater than the steering angular velocity calculated in FIG. 13 so that the steering is made faster, thereby allowing the vehicle to travel in the direction of the target point.

Figure 16:
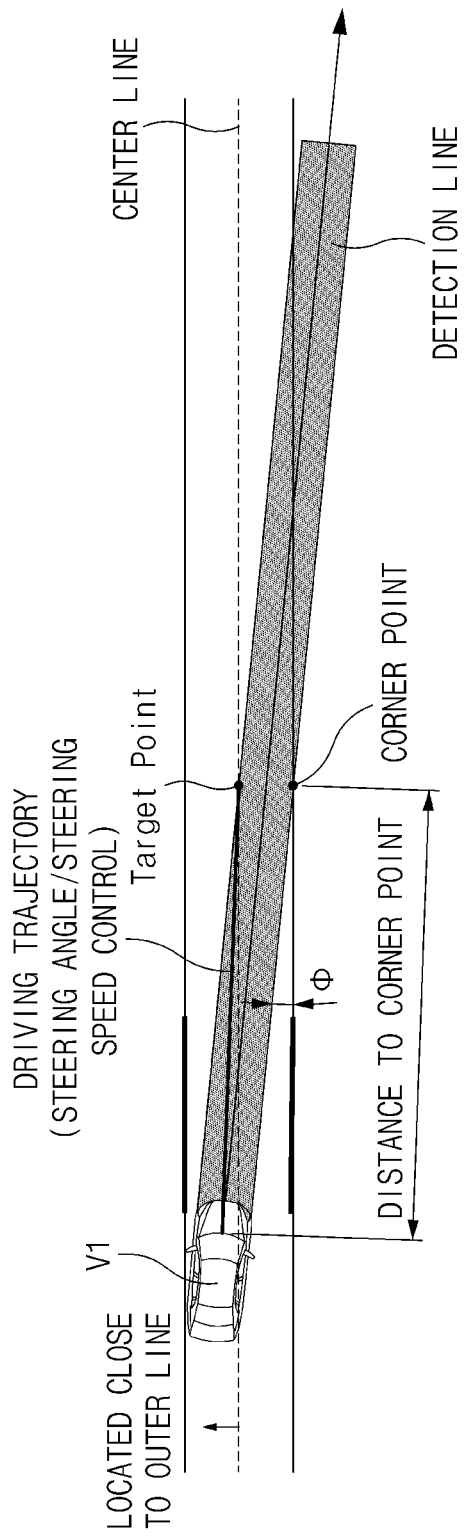

As shown in FIG. 16, the controller 160 may generate a line extending from the center of both side lines of the lane in which the vehicle V1 travels as a center line, generate a point where the detection line and the line meet as a corner point, and set a target point on the center line based on the corner point.

When the angle φ between the detection line and the line is equal to or greater than the reference angle, the controller 160 may determine that the vehicle V1 travels at a location close to the outer line and control the steering angular velocity based on the distance from the camera of the vehicle V1 to the corner point. According to an embodiment, when the distance from the camera of the vehicle V1 to the corner point is less than or equal to the reference distance (e.g., shorter than the distance from the camera of the vehicle V1 to the corner point in FIG. 14), the controller 160 may increase the steering angular velocity to be greater than the steering angular velocity calculated in FIG. 14 so that the steering is made faster, thereby allowing the vehicle to travel in the direction of the target point.

Figure 17:
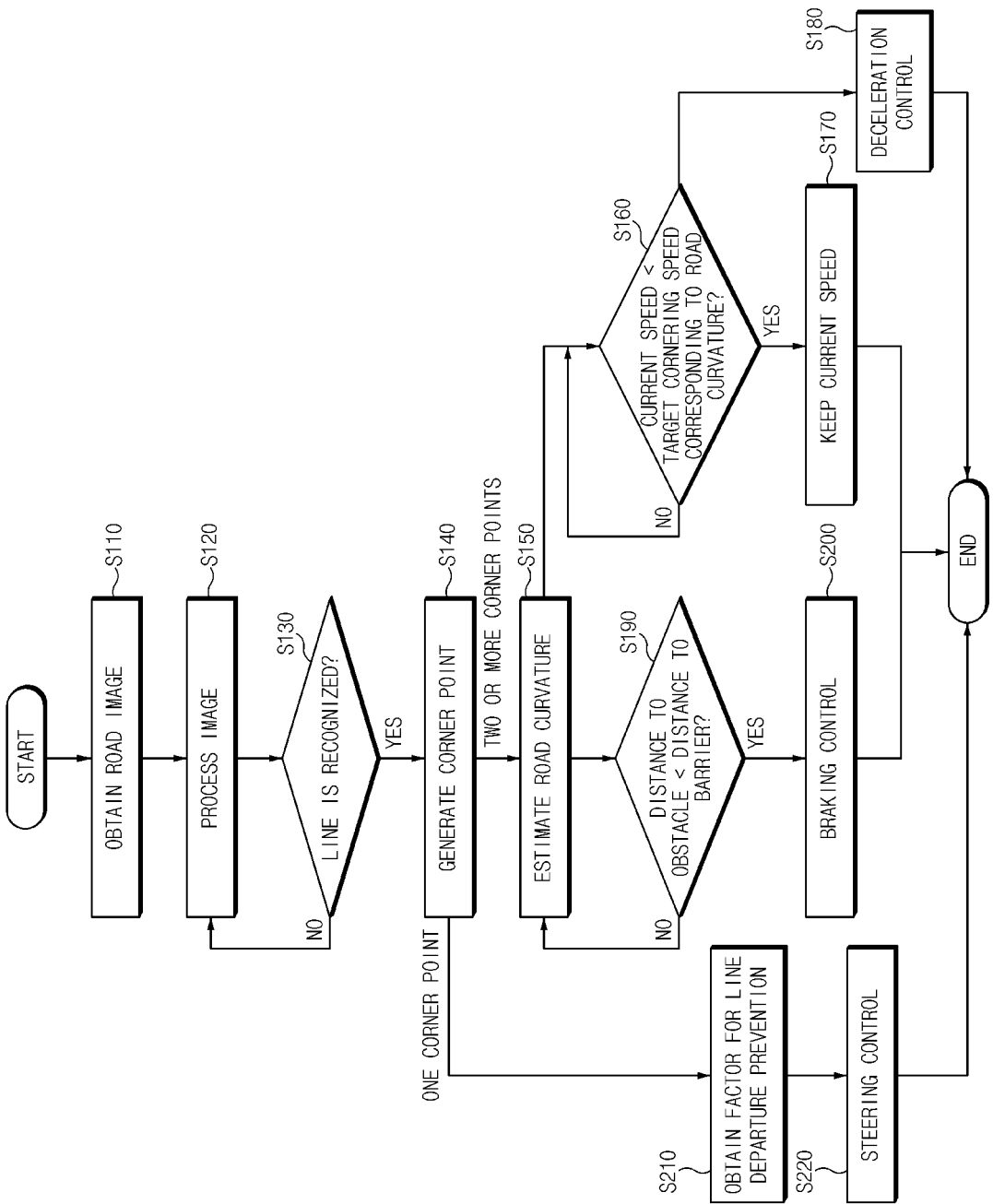
FIGS. 17 and 18 are flowcharts illustrating a method of controlling a vehicle according to an embodiment of the present disclosure.
Figure 18:
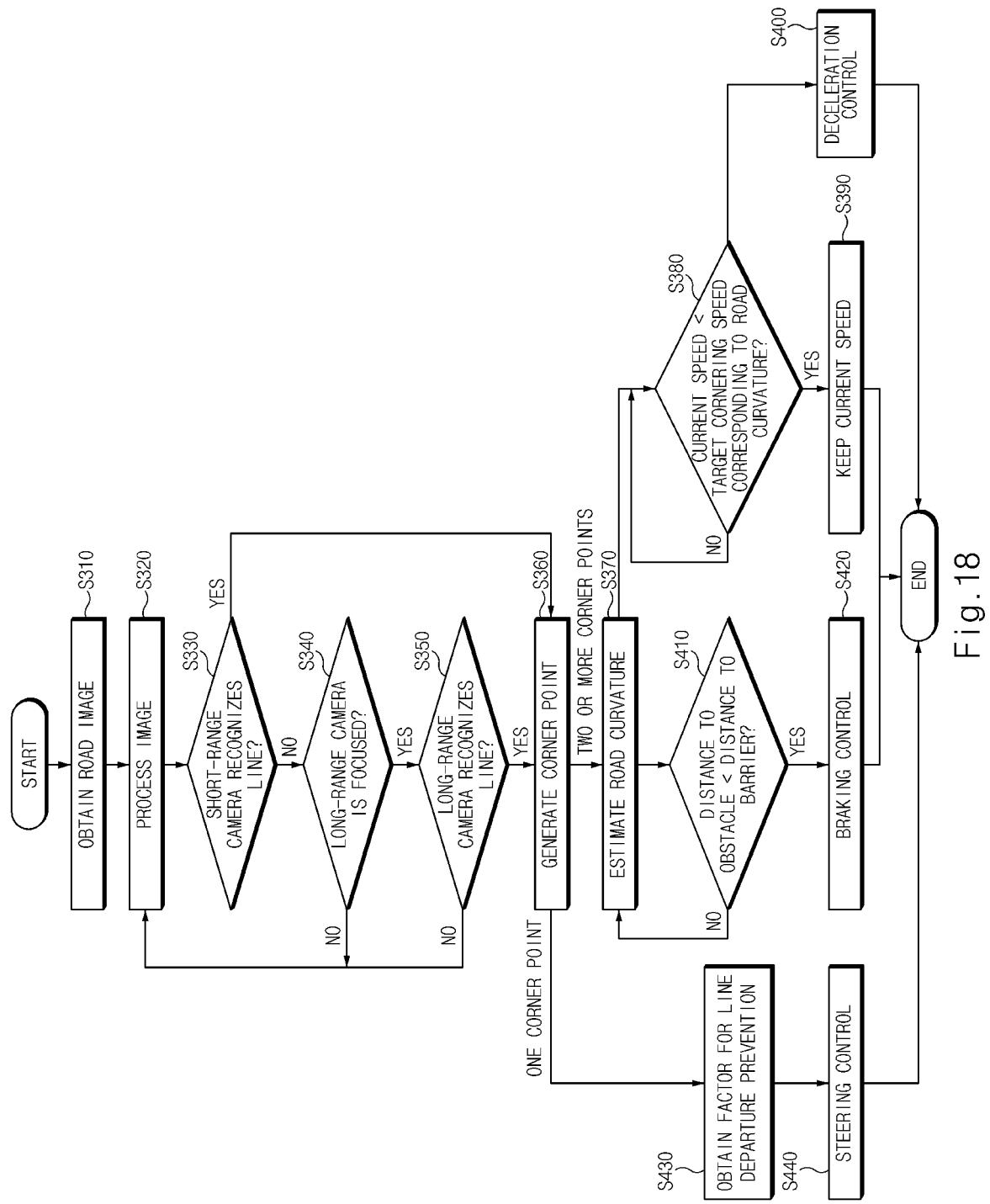

FIGS. 17 and 18 are flowcharts illustrating a method of controlling a vehicle according to an embodiment of the present disclosure.

As shown in FIG. 17, the controller 160 may obtain a road image taken by the camera 130 in S110. In addition, the controller 160 may distort the road image and convert it into a warped view to process the image in S120.

The controller 160 may determine whether a line is recognized based on the road image in S130.

When determining that the line is recognized, the controller 160 may generate a corner point in S140. In S140, the controller 160 may generate a straight center line that coincides with the traveling direction of the vehicle and passes through the center of the vehicle. The controller 160 may generate a detection line having a specified width based on the center line. The controller 160 may generate one or more corner points (a first corner point and a second corner point) at points where the detection line and the line meet. According to an embodiment, the controller 160 may additionally generate a point where the center line and the line meet as a corner point.

When determining that two or more corner points are generated, the controller 160 may estimate the curvature of the road based on the corner point in S150. For a more detailed description of S150, refer to the descriptions of FIGS. 4 and 5.

When the curvature of the road is estimated, the controller 160 may determine a target cornering speed corresponding to the curvature of the road. According to an embodiment of the present disclosure, the controller 160 may determine the target cornering speed corresponding to the curvature of the road based on vehicle characteristics, learned vehicle conditions, weather information, traffic information, road information, and driving information.

The controller 160 may determine whether the current speed is less than the target cornering speed corresponding to the curvature of the road in S160. When it is determined in S160 that the current speed is less than the target cornering speed corresponding to the curvature of the road, in S110, the controller 160 may determine that it is possible to drive while keeping the lane while driving on the curvature of the road and control the vehicle speed to be maintained at the current speed.

When it is determined in S160 that the current speed is not less than the target cornering speed corresponding to the curvature of the road, in S180, the controller 160 may determine that there is a risk of leaving the lane when traveling on the curvature of the road, and the controller 160 may control the speed to decelerate from the current speed.

In S190, the controller 160 may set a cornering line generated by connecting the first corner point and the second corner point as a barrier line when the curvature of the road is estimated and determine whether the distance from a camera of the vehicle to an obstacle is less than a distance to a barrier line. When the distance from the camera of the vehicle to the obstacle is less than the distance to the barrier line in S190, braking control may be performed to prevent collision with the obstacle in S200.

Meanwhile, when it is determined that one corner point is generated, the controller 160 may obtain a factor for line departure prevention based on the corner point in S210. Although not shown, even when one corner point is generated, the curvature of the road may be estimated. For a more detailed description, refer to FIGS. 11 and 12.

In S210, the controller 160 may generate, as a center line, a line extending the center of both side lines of the lane in which the vehicle travels, and set a target point on the center line based on the corner point. In addition, the controller 160 may calculate the distance from the camera of the vehicle to the corner point and calculate the angle φ between the detection line and the line.

In S220, the controller 160 may calculate the distance from the camera of the vehicle to the corner point, compare it with the reference distance, compare the angle φ between the detection line and the line with the reference angle, and control steering based on the comparison results.

As shown in FIG. 18, the controller 160 may obtain the road image captured by the short-range camera and the long-range camera in S310. In addition, in S320, the controller 160 may distort the road image to convert it into a warped view, thereby processing the image.

In S330, the controller 160 may determine whether a line is recognized from the road image obtained by the short-range camera. In S330, the controller 160 may determine whether a line is recognized from the road image of the first FOV within the first distance.

When it is determined in S330 that the line is not recognized from the road image of the first FOV within the first distance, the controller 160 may determine whether the long-range camera is focused in S340. In S340, the controller 160 may determine whether an object located within the second distance longer than the first distance and located farther than the first distance is focused. The controller 160 performs S360 when it is determined in S330 that the line is recognized from the road image of the first FOV within the first distance.

When it is determined that the long-range camera is focused, in S350, the controller 160 may determine whether a line is recognized from the road image obtained by the long-range camera. In S350, the controller 160 may determine whether the line is recognized from the road image of the second FOV within the second distance longer than the first distance.

When determining that the line is recognized, the controller 160 may generate a corner point in S360. In S360, the controller 160 may generate a straight center line that coincides with the traveling direction of the vehicle and passes through the center of the vehicle. The controller 160 may generate a detection line having a specified width based on the center line. The controller 160 may generate one or more corner points (the first corner point and the second corner point) at points where the detection line and the line meet. According to an embodiment, the controller 160 may additionally generate a point where the center line and the line meet as a corner point. A description according to an embodiment refers to FIG. 19.

Figure 19:
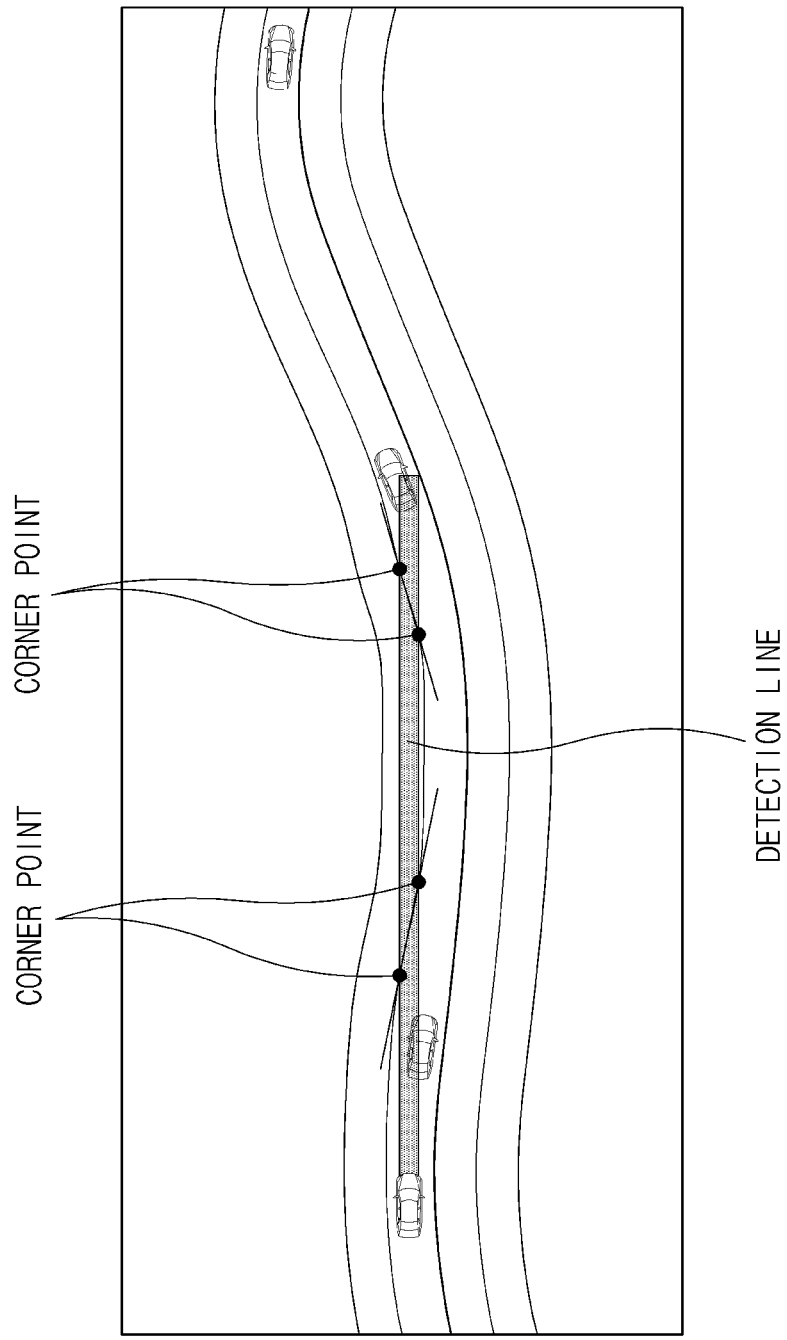
FIG. 19 is a diagram illustrating a corner point generated by a long-range camera according to an embodiment of the present disclosure.

FIG. 19 is a diagram illustrating a corner point generated by a long-range camera according to an embodiment of the present disclosure.

As shown in FIG. 19, because the long-range camera may obtain a plurality of curved road images when a plurality of curved roads exist within the second distance, the controller 160 may generate a plurality of corner points.

When determining that two or more corner points are generated, the controller 160 may predict the curvature of the road based on the corner points in S370. The description of S370 refers to the descriptions of FIGS. 4 and 5.

When the curvature of the road is estimated, the controller 160 may determine a target cornering speed corresponding to the curvature of the road. According to an embodiment of the present disclosure, the controller 160 may first determine the target cornering speed corresponding to the road curvature of a curved road closest to the vehicle. In addition, when determining the target cornering speed, the controller 160 may determine the optimal target cornering speed by reflecting vehicle characteristics, learned vehicle conditions, weather information, traffic information, road information, and driving information.

Thereafter, because the operations of S380 to S440 are the same as those of S160 to S220 of FIG. 17, the detailed description of the operations of S380 to S440 refers to the description of the operations of S160 to S220 of FIG. 17.

Figure 20:
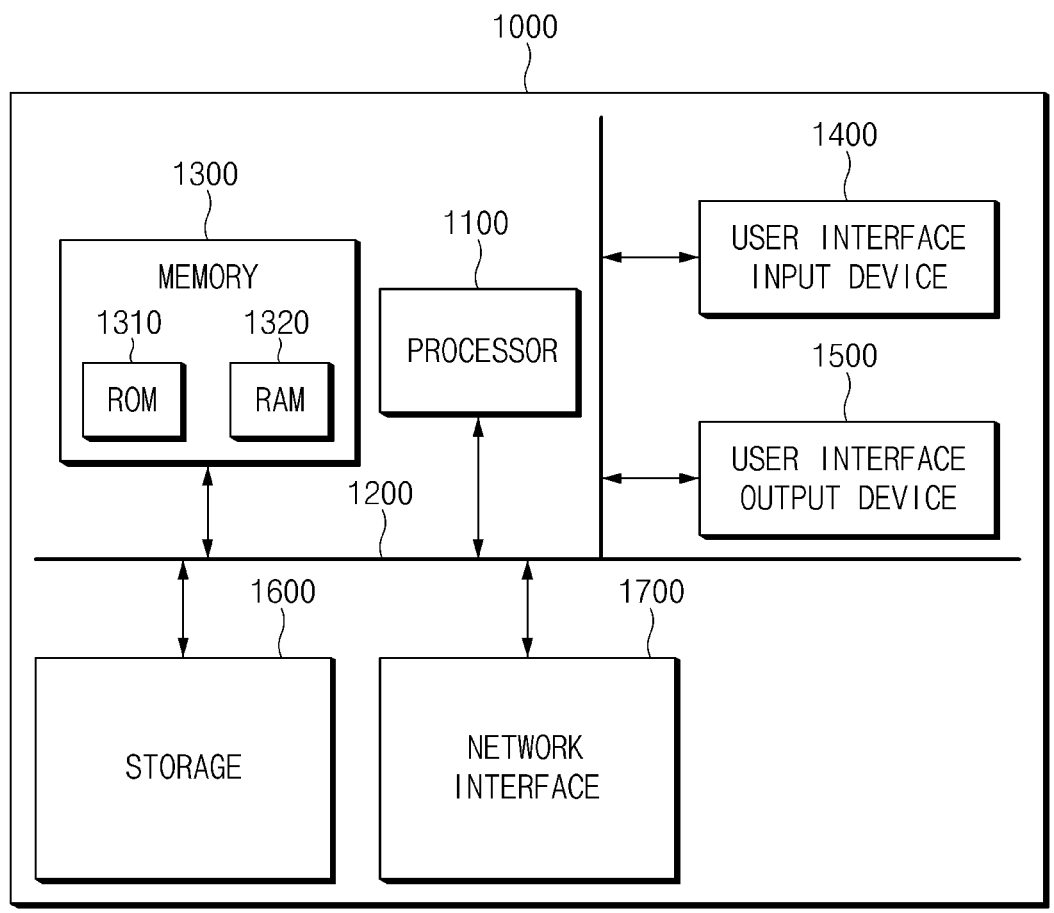
FIG. 20 is a block diagram illustrating a computing system for executing a method according to an embodiment of the present disclosure.

FIG. 20 is a block diagram illustrating a computing system for executing a method according to an embodiment of the present disclosure.

Referring to FIG. 20, a computing system moo may include at least one processor 1100, a memory 1300, a user interface input device 1400, a user interface output device 1500, a memory (i.e., storage) 1600, and a network interface 1700 connected through a bus 1200.

The processor 1100 may be a central processing device (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the apparatus and method for controlling a vehicle may control the steering and vehicle speed according to the traveling direction of the vehicle and the curvature of the road to keep a lane while driving and assist vehicle driving, thereby improving a driver's convenience.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle, the apparatus comprising:
   a camera; and
   a controller configured to:
      generate a detection line having a specified width based on a traveling direction of the vehicle within a road image obtained by the camera;
      generate a first corner point at a point where the detection line meets a line identified in the road image;
      generate corner points comprising three points including the first corner point based on intersections between the detection line, a center line, and the identified line; and
      control a speed of the vehicle by estimating a curvature of a road based on the first corner point or control steering based on an angle between the detection line and the line,
   wherein the speed control is determined based on vehicle characteristics at the corner points.

2. The apparatus of claim 1, wherein the controller is configured to:
   generate a second corner point at a second point where the detection line meets the line;
   generate a cornering line that connects the first corner point and the second corner point and the center line that coincides with the traveling direction of the vehicle and passes through a center of the vehicle when the first corner point and the second corner point are generated; and
   estimate the curvature of the road based on an angle between the cornering line and the center line.

3. The apparatus of claim 2, wherein the controller is configured to generate an arc passing through the first corner point and estimate the curvature of the road based on a radius of curvature of the arc when two or more corner points are generated by additionally generating corner points where the center line meets the line.

4. The apparatus of claim 2, wherein the controller is configured to set the cornering line as a barrier line and to control braking when a distance to an obstacle detected in front of the vehicle is less than a distance to the barrier line.

5. The apparatus of claim 1, wherein the controller is configured to determine a target cornering speed corresponding to the estimated curvature of the road based on vehicle characteristics, a learned vehicle condition, weather information, traffic information, road information, or driving information.

6. The apparatus of claim 5, wherein the controller is configured to:
   control deceleration when a current speed of the vehicle is greater than or equal to the target cornering speed; and
   control to maintain the current speed when the current speed of the vehicle is less than the target cornering speed.

7. The apparatus of claim 1, wherein the controller is configured to generate a target point at a center of a road based on the first corner point when the first corner point is generated, determine the angle between the detection line and the line, determine whether the vehicle is located at a shorter distance to an inner line or an outer line based on the angle, and control steering according to a determination result.

8. The apparatus of claim 7, wherein the controller is configured to determine, among both side lines of a lane in which the vehicle travels, the line in which the first corner point is generated as the inner line and determine the line in which the first corner point is not generated as the outer line.

9. The apparatus of claim 7, wherein the controller is configured to increase a steering angular velocity as the vehicle approaches the inner line.

10. The apparatus of claim 1, wherein the camera comprises:
    a first camera configured to obtain the road image in a first field of view (FOV); and
    a second camera configured to obtain a plurality of curved road images in a second FOV that is wider than the first FOV.

11. A method of controlling a vehicle, the method comprising:
    obtaining a road image by using a camera;
    generating a detection line having a specified width based on a traveling direction of the vehicle within the road image;
    generating a first corner point at a point where the detection line meets a line identified in the road image;
    generating corner points comprising three points including the first corner point based on intersections between the detection line, a center line, and a line identified in the road image; and
    controlling a vehicle speed by estimating a curvature of a road based on the first corner point or controlling steering based on an angle between the detection line and the line,
    wherein the speed control is determined based on vehicle characteristics at the corner points.

12. The method of claim 11, further comprising:
generating a second corner point at a second point where the detection line meets the line identified in the road image;
generating a cornering line that connects the first corner point and the second corner point and the center line that coincides with the traveling direction of the vehicle and passes through a center of the vehicle when the first corner point and the second corner point are generated; and
estimating the curvature of the road based on an angle between the cornering line and the center line.

13. The method of claim 12, further comprising generating an arc passing through the first corner point and estimating the curvature of the road based on a radius of curvature of the arc when two or more points are generated by additionally generating corner points where the center line meets the line.

14. The method of claim 12, further comprising:
setting the cornering line as a barrier line; and
controlling braking when a distance to an obstacle detected in front of the vehicle is less than a distance to the barrier line.

15. The method of claim 11, further comprising determining a target cornering speed corresponding to the estimated curvature of the road based on vehicle characteristics, a learned vehicle condition, weather information, traffic information, road information, or driving information.

16. The method of claim 15, further comprising:
controlling deceleration when a current speed of the vehicle is greater than or equal to the target cornering speed; and
controlling to maintain the current speed when the current speed of the vehicle is less than the target cornering speed.

17. The method of claim 11, further comprising:
generating a target point at a center of the road based on the first corner point when the first corner point is generated;
determining whether the vehicle is located at a shorter distance to an inner line or an outer line based on the angle;
determining the angle between the detection line and the line; and
controlling steering according to a determination result.

18. The method of claim 17, further comprising:
determining, among both side lines of a lane in which the vehicle travels, the line in which the first corner point is generated as the inner line and determining the line in which the first corner point is not generated as the outer line.

19. The method of claim 17, further comprising increasing a steering angular velocity as the vehicle approaches the inner line.

20. The method of claim 11, wherein the camera comprises:
a first camera that obtains the road image in a first field of view (FOV); and
a second camera that obtains a plurality of curved road images in a second FOV that is wider than the first FOV.

* * * * *